US012723930B2

(12) United States Patent
Wang et al.

(10) Patent No.: US 12,723,930 B2
(45) Date of Patent: Sep. 1, 2026

(54) METHOD AND APPARATUS FOR MEASURING SURFACE TEMPERATURE OF AN OBJECT

(71) Applicant: JILIN ZHONG YING HIGH TECHNOLOGY CO., LTD., Changchun (CN)

(72) Inventors: Chao Wang, Changchun (CN); Aimi Wen, Changchun (CN)

(73) Assignee: JILIN ZHONG YING HIGH TECHNOLOGY CO., LTD., Changchun (CN)

( * ) Notice: Subject to any disclaimer, the term of this patent is extended or adjusted under 35 U.S.C. 154(b) by 309 days.

(21) Appl. No.: 18/580,016

(22) PCT Filed: Jul. 21, 2022

(86) PCT No.: PCT/CN2022/107002
§ 371 (c)(1),
(2) Date: Jan. 17, 2024

(87) PCT Pub. No.: WO2023/005788
PCT Pub. Date: Feb. 2, 2023

(65) Prior Publication Data

US 2024/0344902 A1 Oct. 17, 2024

(30) Foreign Application Priority Data

Jul. 27, 2021 (CN) ......................... 202110851896.4

(51) Int. Cl.

| | |
|---|---|
| ***G01K 15/00*** | (2006.01) |
| ***G01K 1/143*** | (2021.01) |
| ***G01K 3/10*** | (2006.01) |

(52) U.S. Cl.
CPC .......... *G01K 15/005* (2013.01); *G01K 1/143* (2013.01); *G01K 3/10* (2013.01); *G01K 2219/00* (2013.01)

(58) Field of Classification Search
CPC ... G01K 15/005; G01K 2219/00; G01K 1/143
(Continued)

(56) References Cited

U.S. PATENT DOCUMENTS

| | | | |
|---|---|---|---|
| 8,924,190 | B2 | 12/2014 | Djelassi |
| 2011/0238351 | A1 | 9/2011 | Djelassi |

(Continued)

FOREIGN PATENT DOCUMENTS

| | | | |
|---|---|---|---|
| CN | 106092365 | A | 11/2016 |
| CN | 109073474 | A | 12/2018 |

(Continued)

OTHER PUBLICATIONS

Extended European Search Report issued on Nov. 8, 2024 for counterpart European Patent Application No. 22848393.9, 9 pages.

(Continued)

*Primary Examiner* — Mirellys Jagan
(74) *Attorney, Agent, or Firm* — LOZA & LOZA, LLP; Michael Fedrick

(57) ABSTRACT

This disclosure provides a method and apparatus for measuring a surface temperature of an object. The method includes: obtaining a temperature measured by a temperature sensing device at a current moment and at a moment previous to the current moment after the temperature sensing device contacts with a surface of a measured object for a set duration, the temperature sensing device being in conductive contact with the surface of the measured object; determining a temperature compensation factor at the current moment based on the temperature measured by the temperature sensing device at the current moment and the moment (Continued)

previous to the current moment; obtaining a correction factor of the temperature compensation factor; obtaining a static correction factor; and determining a surface temperature of the measured object at the current moment. This disclosure can accurately measure the temperature without damaging the measured object.

12 Claims, 4 Drawing Sheets

(58) Field of Classification Search
USPC .............................................................. 374/1
See application file for complete search history.

(56) References Cited

U.S. PATENT DOCUMENTS

2012/0283849 A1 11/2012 Kureemun
2015/0088333 A1* 3/2015 Delano ................. G01J 5/0003
700/300
2016/0320252 A1* 11/2016 Ostermeyer ........... G01N 21/43
2019/0041275 A1 2/2019 Merlin

FOREIGN PATENT DOCUMENTS

CN 110956338 A 4/2020
CN 111522398 A 8/2020
CN 211347146 U 8/2020
CN 112013978 A 12/2020
CN 112197932 A 1/2021
CN 112525387 A 3/2021
CN 112945411 A 6/2021
CN 113588122 A 11/2021
CN 113884219 A * 1/2022 ............. G01K 1/143
DE 102016107335 A1 10/2017
JP 2017026513 A 2/2017
WO 2012119829 A1 9/2012
WO 2012/154525 A1 11/2012
WO WO-2016046937 A1 * 3/2016 ............. G01K 15/00

OTHER PUBLICATIONS

Decision to Grant a Patent issued for corresponding Japanese Patent Application No. 2024-504572, mailed on Jan. 31, 2025, 5 pages.
Examination Report issued for corresponding European Patent Application No. 22848393.9 dated Sep. 1, 2025 (6 pages).
International Search Report issued for counterpart International Application No. PCT/CN2022/107002 dated Oct. 8, 2022, 3 pgs.
First Office Action and search report issued on Dec. 20. 2022 for counterpart Chinese Patent Application No. 202110851896.4 with machine EN translation downloaded from EPO.
Decision of Rejection issued for counterpart Chinese Patent Application No. 202110851896.4 with its machine EN translation, Mar. 10, 2023, 12 pgs.

* cited by examiner

METHOD AND APPARATUS FOR MEASURING SURFACE TEMPERATURE OF AN OBJECT

CROSS-REFERENCE TO RELATED APPLICATIONS

This application is the U.S. national stage of International Patent Application No. PCT/CN2022/107002, filed Jul. 21, 2022, which claims priority to Chinese Patent Application No. 202110851896.4, entitled "Method and Apparatus for Measuring Surface Temperature of an Object" filed on Jul. 27, 2021, both of which are hereby incorporated by reference in their entireties.

TECHNICAL FIELD

This disclosure relates to the technical field of sensor measurement, in particular to a method and apparatus for measuring a surface temperature of an object.

BACKGROUND

All measured objects have corresponding temperature ranges that can be withstood, within which normal properties of the measured objects can only be guaranteed. In most cases, the measured object itself cannot be damaged, thus a temperature of the object can only be reflected from a surface temperature of the object. Although the measured object itself can withstand various temperatures, precise temperature monitoring is also very crucial to ensure the safety of lives around the measured object, the measured object itself, the environment, or the like. When the object is experiencing a high gradient temperature changes, the difficulty in accurately monitoring temperature significantly increases. Therefore, there is an urgent need for a method to accurately measure a surface temperature of an object to ensure precise temperature monitoring of the measured object itself without being damaged, in order to prevent unnecessary danger.

SUMMARY

An embodiment of this disclosure provides a method for measuring a surface temperature of an object to accurately measure a temperature of a measured object without being damaged, including:

obtaining a temperature measured by a temperature sensing device at a current moment and at a moment previous to the current moment after the temperature sensing device contacts with a surface of a measured object for a set duration, and the temperature sensing device being in conductive contact with the surface of the measured object;

determining a temperature compensation factor at the current moment based on the temperature measured by the temperature sensing device at the current moment and at the moment previous to the current moment;

obtaining a correction factor of the temperature compensation factor;

obtaining a static correction factor; and determining a surface temperature of the measured object at the current moment based on one or more of the temperature measured by the temperature sensing device at the current moment, the temperature compensation factor at the current moment, the correction factor of the temperature compensation factor, and the static correction factor.

An embodiment of this disclosure provides an apparatus for measuring a surface temperature of an object to accurately measure a temperature of a measured object without being damaged, including:

a temperature measurement acquisition module configured to obtain a temperature measured by a temperature sensing device at a current moment and at a moment previous to the current moment after the temperature sensing device contacts with a surface of a measured object for a set duration, and the temperature sensing device being in conductive contact with the surface of the measured object;

a temperature compensation factor determination module configured to determine a temperature compensation factor at the current moment based on the temperature measured by the temperature sensing device at the current moment and at the moment previous to the current moment;

a first correction factor acquisition module configured to obtain a correction factor of the temperature compensation factor;

a second correction factor acquisition module configured to obtain a static correction factor: and an object surface temperature acquisition module configured to determine a surface temperature of the measured object at the current moment based on one or more of the temperature measured by the temperature sensing device at the current moment, the temperature compensation factor at the current moment, the correction factor of the temperature compensation factor, and the static correction factor.

An embodiment of this disclosure also provides a computer device, including: a memory, a processor, and a computer program stored on the memory that can run on the processor, in which the processor implements the method for measuring a surface temperature of an object when executing the computer program.

An embodiment of this disclosure also provides a computer readable storage medium storing a computer program that implements the method for measuring a surface temperature of an object.

In the embodiment of this disclosure, the temperature measured by the temperature sensing device at the current moment and at the moment previous to the current moment is obtained after the temperature sensing device contacts with the surface of the measured object for the set duration, the temperature sensing device is in conductive contact with the surface of the measured object: the temperature compensation factor at the current moment is determined based on the temperature measured by the temperature sensing device at the current moment and at the moment previous to the current moment: the correction factor of the temperature compensation factor is obtained: the static correction factor is obtained: and the surface temperature of the measured object at the current moment is determined based on one or more of the temperature measured by the temperature sensing device at the current moment, the temperature compensation factor at the current moment, the correction factor of the temperature compensation factor, and the static correction factor. In the process, first of all, the temperature compensation factor at the current moment is determined, both the correction factor of the temperature compensation factor and the static correction factor are adopted in the process, so as to realize the calibration and adjustment of the surface temperature measurement of the object by a plurality of corrections, and realize the accuracy within ±3° C. even with a high temperature gradient.

BRIEF DESCRIPTION OF THE DRAWINGS

The drawings illustrated herein are intended to provide a further understanding of this disclosure, form a part of this disclosure, and constitute no limitation of this disclosure.

DETAILED DESCRIPTION

In order to more clearly describe the objective, technical solutions and advantages in the embodiments of this disclosure, the embodiments of the present invention will be further described in detail with reference to the drawings. The exemplary embodiments of this disclosure and the description thereof are used herein to demonstrate this disclosure, but are not used as a limitation of this disclosure.

Figure 1:
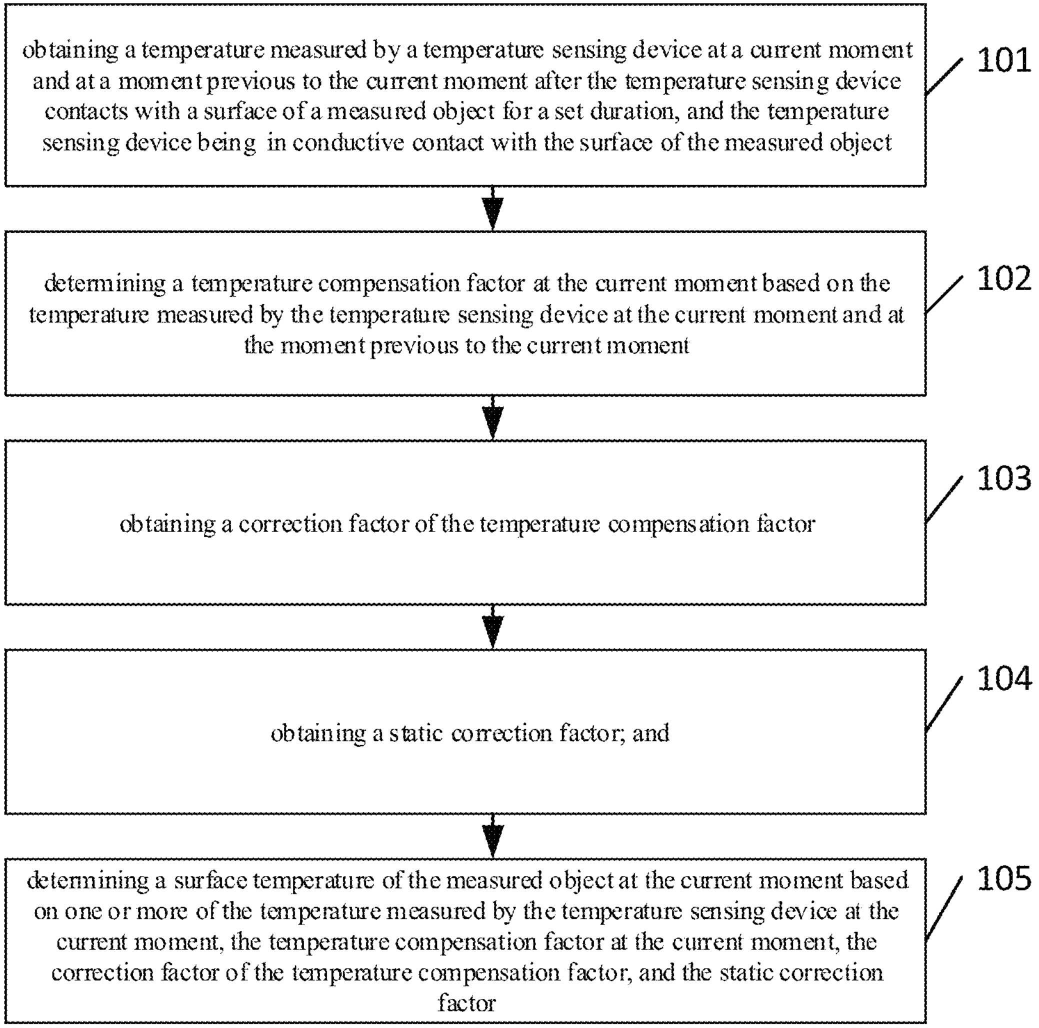
FIG. 1 is a flowchart illustrating a method for measuring a surface temperature of an object in an embodiment of this disclosure.

FIG. 1 is a flowchart illustrating a method for measuring a surface temperature of an object in an embodiment of this disclosure. As illustrated in FIG. 1, the method includes the steps of:

Step 101, obtaining a temperature measured by a temperature sensing device at a current moment and at a moment previous to the current moment after the temperature sensing device contacts with a surface of a measured object for a set duration, and the temperature sensing device being in conductive contact with the surface of the measured object:

Step 102, determining a temperature compensation factor at the current moment based on the temperature measured by the temperature sensing device at the current moment and at the moment previous to the current moment:

Step 103, obtaining a correction factor of the temperature compensation factor:

Step 104, obtaining a static correction factor; and

Step 105, determining a surface temperature of the measured object at the current moment based on one or more of the temperature measured by the temperature sensing device at the current moment, the temperature compensation factor at the current moment, the correction factor of the temperature compensation factor, and the static correction factor.

In the embodiment of this disclosure, first of all, the temperature compensation factor at the current moment is determined, both the correction factor of the temperature compensation factor and the static correction factor are adopted in the process, so as to realize the calibration and adjustment of the surface temperature measurement of the object by a plurality of corrections, and realize the accuracy within ±3° C. even with a high temperature gradient.

In the step 101, obtaining a temperature measured by a temperature sensing device at a current moment and at a moment previous to the current moment after the temperature sensing device contacts with a surface of a measured object for a set duration, the measured object and the temperature sensing device being simultaneously placed in an enclosed space, and the temperature sensing device being in complete contact with the surface of the measured object, in which the measured object and the temperature sensing device are placed in a small enclosed space to create a temperature measurement chamber, which is the first prerequisite for temperature measurement.

Figure 2:
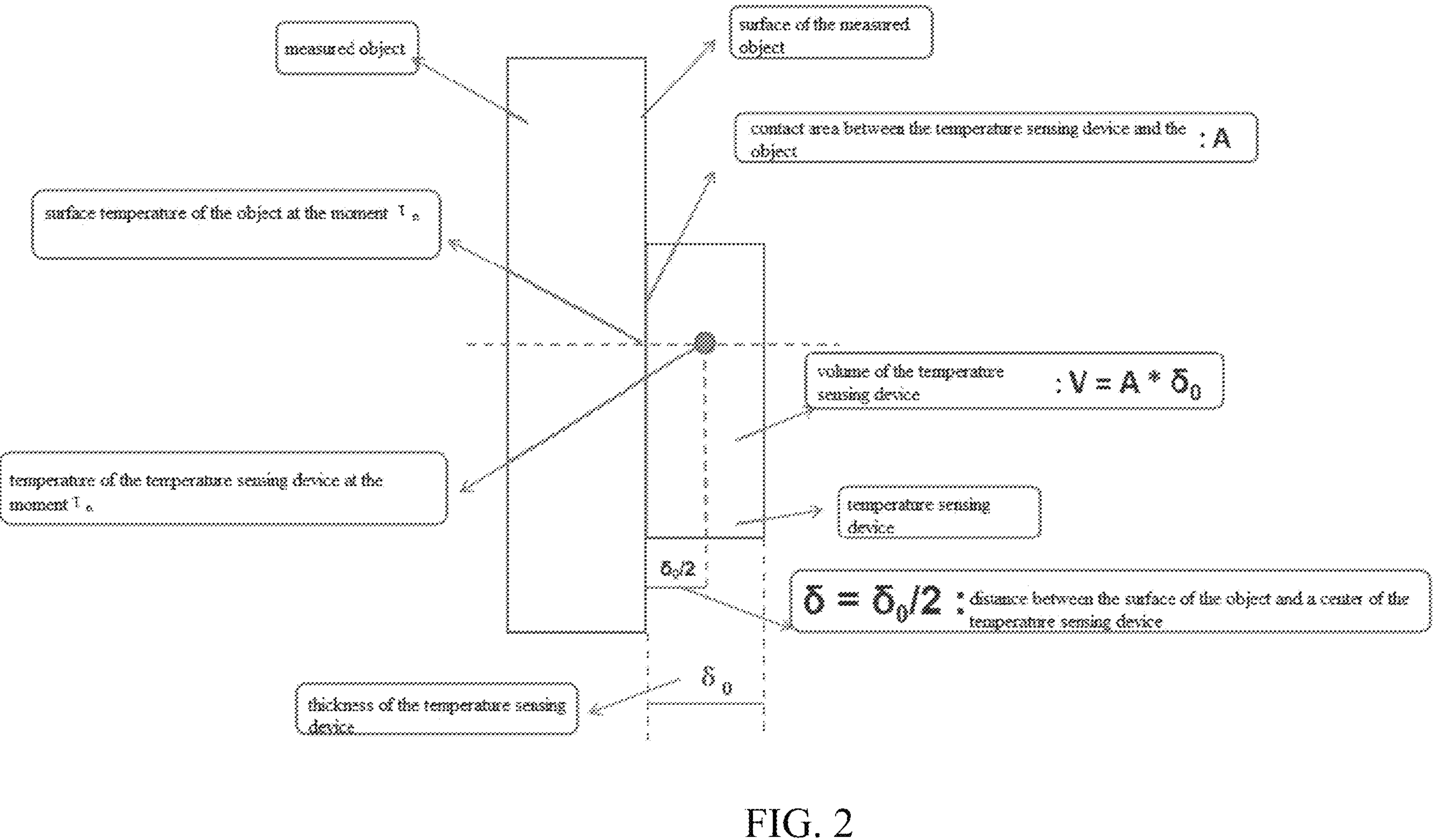
FIG. 2 is a schematic diagram illustrating temperature measurement in an embodiment of this disclosure.

The second prerequisite for temperature measurement is that the temperature sensing device needs to be in complete contact with the surface of the measured object, and ensuring contact surface remains unchanged, the larger the contact area between the temperature sensing device and the measured object, the better. FIG. 2 is a schematic diagram illustrating temperature measurement in an embodiment of this disclosure. The temperature sensing device has a smaller surface area than the measured object. Thus, the surface area of the temperature sensing device can be fully utilized for calculation, and the temperature sensing device is a fairly regular cuboid, which makes it convenient to calculate its volume. In general, the temperature sensing device generally needs to be fixed with a bracket to prevent the device from moving and affecting measurement accuracy.

The third prerequisite for temperature measurement is that a housing of the temperature sensing device has good thermal conductivity, in order to ensure that the temperature rise of the object for a certain duration can be fully transferred to the temperature sensing device.

In an embodiment, ADC (Analog Digital Converter) of the temperature sensing device has an acquisition accuracy of at least 8 bits, which is also the fourth prerequisite for temperature measurement.

In an embodiment, referring to FIG. 2, the step of determining a temperature compensation factor at the current moment based on the temperature measured by the temperature sensing device at the current moment and at the moment previous to the current moment, includes:

- determining a first factor based on one or more of a specific heat capacity of the temperature sensing device, a density of the temperature sensing device, a volume V of the temperature sensing device, a distance $\delta$ between a center of the temperature sensing device and the surface of the measured object, and a contact area A between the temperature sensing device and the measured object, wherein the temperature sensing device has a thickness $\delta_0$, $\delta=\delta_0/2$, and $V=A*\delta_0$;
- determining a second factor based on one or more of the first factor and a conductivity coefficient;
- determining the temperature compensation factor at the current moment (e.g., the moment $\tau_n$ shown in FIG. 2) based on one or more of the second factor, the temperature measured by the temperature sensing device at the current moment, the temperature measured by the temperature sensing device at the moment previous to the current moment, and a time interval between the current moment and the moment previous to the current moment.

Considering that temperature measurements by the temperature sensing apparatus are conducted under static conditions, the temperature compensation factor is approximately equal to zero, therefore, the static correction factor, which can be obtained through a large number of simulation experiments, can be introduced, can further correct the temperature measured by the temperature sensing device, and further improve the measurement accuracy of the surface temperature of the object, so that the accuracy within ±3° C. even with a high temperature gradient may be achieved.

In an embodiment, the method further includes:

obtaining a correction factor for a medium in the presence of the medium between the measured object and the temperature sensing device, and the medium is in conductive contact with the surface of the measured object and the temperature sensing device respectively: and determining the surface temperature of the measured object at the current moment based on one or more of the temperature measured by the temperature sensing device at the current moment, the temperature compensation factor at the current moment, the correction factor of the temperature compensation factor, the static correction factor, and the correction factor of the medium.

In the embodiment, in another measurement method when the medium is present between the measured object and the temperature sensing device, it is necessary to ensure that the intermediate medium has good thermal conductivity, in order to ensure temperature conduction velocity and insulation performance unchanged.

The correction factor of the medium is also determined through a large number of simulation experiments. Introducing the correction factor of the medium can correct the measurement errors due to the presence of the medium, and the measurement accuracy of the surface temperature of the measured object is further improved.

To sum up, in the method provided in the embodiment of this disclosure, the temperature measured by the temperature sensing device at the current moment and at the moment previous to the current moment is obtained after the temperature sensing device contacts with the surface of the measured object for a set duration, the temperature sensing device is in conductive contact with the surface of the measured object: the temperature compensation factor at the current moment is determined based on the temperature measured by the temperature sensing device at the current moment and at the moment previous to the current moment: the correction factor of the temperature compensation factor is obtained: the static correction factor is obtained; and the surface temperature of the measured object at the current moment is determined based on one or more of the temperature measured by the temperature sensing device at the current moment, the temperature compensation factor at the current moment, the correction factor for the temperature compensation factor, and the static correction factor. In the process, first of all, the temperature compensation factor at the current moment is determined, both the correction factor for the temperature compensation factor and the static correction factor are adopted in the process, so as to realize the calibration and adjustment of the surface temperature measurement of the object by a plurality of corrections, and realize the accuracy within ±3° C. even with a high temperature gradient.

An embodiment of this disclosure further provides an apparatus for measuring a surface temperature of an object, of which the principle is similar to the method for measuring a surface temperature of an object, and details will not be reiterated here.

Figure 3:
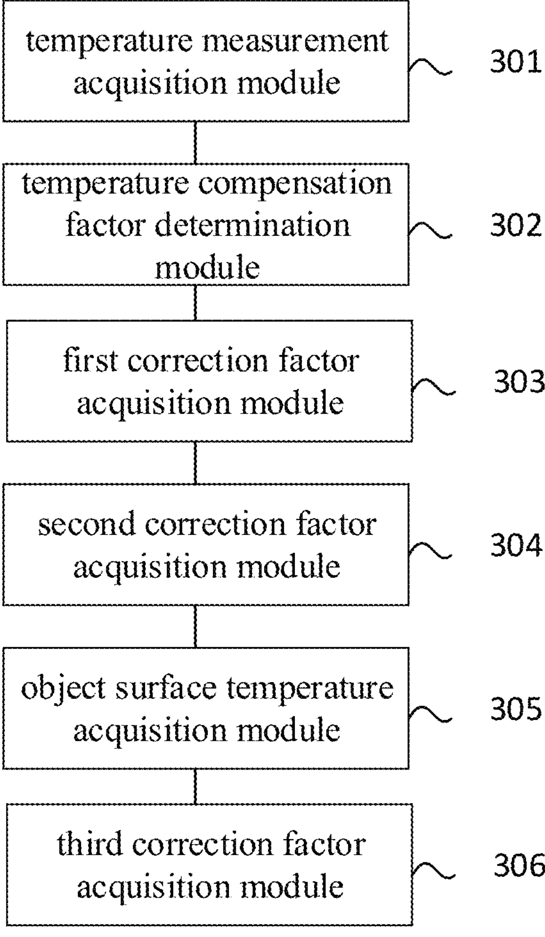
FIG. 3 is a schematic diagram illustrating an apparatus for measuring a surface temperature of an object in an embodiment of this disclosure.

FIG. 3 is a schematic diagram illustrating an apparatus for measuring a surface temperature of an object in an embodiment of this disclosure. As illustrated in FIG. 3, the apparatus includes:

a temperature measurement acquisition module 301 configured to obtain a temperature measured by a temperature sensing device at a current moment and at a moment previous to the current moment after the temperature sensing device contacts with a surface of a measured object for a set duration, and the temperature sensing device being in conductive contact with the surface of the measured object;

a temperature compensation factor determination module 302 configured to determine a temperature compensation factor at the current moment based on the temperature measured by the temperature sensing device at the current moment and at the moment previous to the current moment;

a first correction factor acquisition module 303 configured to obtain a correction factor of the temperature compensation factor;

a second correction factor acquisition module 304 configured to obtain a static correction factor: and an object surface temperature acquisition module 305 configured to determine a surface temperature of the measured object at the current moment based on one or more of the temperature measured by the temperature sensing device at the current moment, the temperature compensation factor at the current moment, the correction factor of the temperature compensation factor, and the static correction factor.

In an embodiment, the temperature compensation factor determination module is specifically configured to determine a first factor based on one or more of a specific heat capacity of the temperature sensing device, a density of the temperature sensing device, a volume of the temperature sensing device, a distance between a center of the temperature sensing device and the surface of the measured object, and a contact area between the temperature sensing device and the measured object:

determine a second factor based on one or more of the first factor and a conductivity coefficient: and determine the temperature compensation factor at the current moment based on one or more of the second factor, the temperature measured by the temperature sensing device at the current moment, the temperature measured by the temperature sensing device at the moment previous to the current moment, and a time interval between the current moment and the moment previous to the current moment.

In an embodiment, the device further includes:

a third correction factor acquisition module 306 configured to obtain a correction factor for a medium in the presence of the medium between the measured object and the temperature sensing device, and the medium is in conductive contact with the surface of the measured object and the temperature sensing device, respectively; and an object surface temperature acquisition module 305 is further configured to determine the surface temperature of the measured object at the current moment based on one or more of the temperature measured by the temperature sensing device at the current moment, the temperature compensation factor at the current moment, the correction factor of the temperature compensation factor, the static correction factor, and the correction factor of the medium.

In an embodiment, ADC of the temperature sensing device has acquisition accuracy of at least 8 bits.

To sum up, in the device provided in the embodiment of this disclosure, the temperature measured by the temperature sensing device at the current moment and at the moment previous to the current moment is obtained after the temperature sensing device contacts with the surface of the measured object for the set duration, the temperature sensing device is in conductive contact with the surface of the measured object: the temperature compensation factor at the current moment is determined based on the temperature measured by the temperature sensing device at the current moment and at the moment previous to the current moment: the correction factor for the temperature compensation factor is obtained: the static correction factor is obtained; and the surface temperature of the measured object at the current moment is determined based on one or more of the temperature measured by the temperature sensing device at the current moment, the temperature compensation factor at the current moment, the correction factor of the temperature compensation factor, and the static correction factor. In the process, first of all, the temperature compensation factor at the current moment is determined, both the correction factor of the temperature compensation factor and the static correction factor are adopted in the process, so as to realize the calibration and adjustment of the surface temperature measurement of the object by a plurality of corrections, and realize the accuracy within ±3° C. even with a high temperature gradient.

Figure 4:
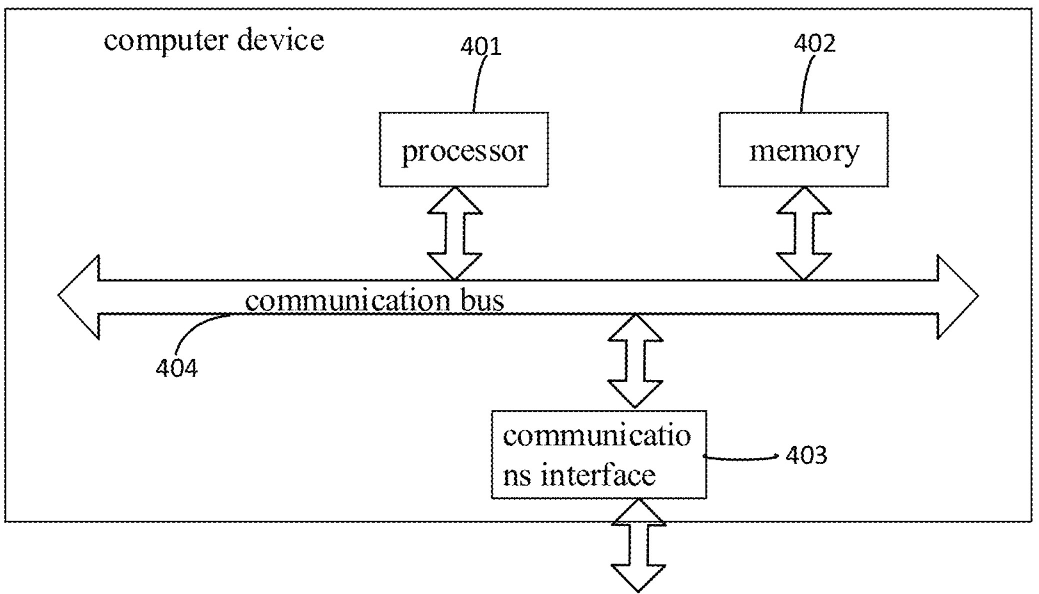
FIG. 4 is a schematic diagram illustrating a computer device in an embodiment of this disclosure.

An embodiment of this disclosure further provides a computer device. FIG. 4 is a schematic diagram illustrating a computer device in an embodiment of this disclosure. The computer device can realize all the steps in the method for measuring a surface temperature of an object in the embodiment. The computer device specifically includes:

a processor 401, a memory 402, a communications interface 403 and a communication bus 404.

The processor 401, the memory 402 and the communication interface 403 communicate with each other via the communication bus 404. The communication interface 403 is configured to realize information transmission between related devices such as a server device, a detection device and a user equipment.

The processor 401 is configured to call a computer program in the memory 402, and the processor realizes all the steps in the method for measuring a surface temperature of an object in the embodiment when executing the computer program.

An embodiment of this disclosure further provides a computer readable storage medium, which can realize all the steps in the method of measuring a surface temperature of an object in the embodiment. The computer readable storage medium stores a computer program, which realizes all the steps in the method for measuring a surface temperature of an object in the embodiment when the computer program is executed by a processor.

Those skilled in the art should appreciate that the embodiments of this disclosure may be provided as a method, a system, or a computer program product. Thus, this disclosure may take forms of embodiments in which hardware is involved alone, embodiments in which software is involved alone, or embodiments in which software is combined with hardware. This disclosure may take the form of a computer program product implemented on one or more computer-usable storage media (including, but not limited to, a disc memory, a CD-ROM, an optical memory, or the like) including a computer-usable program code therein.

This disclosure is described with reference to the flowchart and/or block diagram of method, device (system), and computer program product according to the embodiments of this disclosure. It should be understood that each process and/or block in the flowchart and/or block diagram, and a combination of processes and/or blocks in the flowchart and/or block diagram, may be implemented by computer program instructions. These computer program instructions may be provided to a processor of a general-purpose computer, a special-purpose computer, an embedded processing device, or other programmable data processing device to produce a machine, so that instructions executed by a processor of a computer or other programmable data processing device produce a device for implementing the functions specified in one or more processes of the flowchart and/or one or more blocks of the block diagram.

These computer program instructions may also be stored in a computer readable memory that causes a computer or other programmable data processing device to operate in a particular manner, so that the instructions stored in the computer readable memory produce an article of manufacture including an instruction device that is configured to implement the functions specified in one or more processes in the flowchart and/or one or more blocks in the block diagram.

These computer program instructions may also be loaded onto a computer or other programmable data processing device, so as to execute a series of operational steps on a computer or other programmable device to implement a computer-implemented processing, such that instructions executed on the computer or other programmable device provide steps for implementing the functions specified in one or more processes in the flowchart and/or one or more blocks in the block diagram.

The specific embodiments further illustrate the objective, technical solutions and advantageous effects of this disclosure in details. It should be understood that the objective, technical solutions and advantageous effects are only specific embodiments of this disclosure, and are not intended to limit the protection scope of this disclosure. Any amendment, equivalent replacement, improvement made within the spirit and principles of this disclosure shall be included in the protection scope of this disclosure.

The invention claimed is:

1. A method for measuring a surface temperature of a measured object, comprising:

obtaining a temperature measured by a temperature sensing device at a current moment and at a moment previous to the current moment after the temperature sensing device contacts with a surface of the measured object for a set duration, the temperature sensing device being in thermally conductive contact with the surface of the measured object throughout the temperature measurements;

determining a temperature compensation factor at the current moment based on the temperature measured by the temperature sensing device at the current moment and at the moment previous to the current moment;

obtaining a correction factor of the temperature compensation factor;

obtaining a static correction factor, wherein the static correction factor is pre-determined by simulations to correct the temperature measured by the temperature sensing device at the current moment; and determining a surface temperature of the measured object at the current moment based on one or more of the temperature measured by the temperature sensing device at the current moment, the temperature compensation factor at the current moment, the correction factor of the temperature compensation factor, and the static correction factor.

2. The method for measuring a surface temperature of a measured object as claimed in claim 1, wherein the step of determining a temperature compensation factor at the current moment based on the temperature measured by the temperature sensing device at the current moment and at the moment previous to the current moment, comprises:

determining a first factor based on one or more of a specific heat capacity of the temperature sensing device, a density of the temperature sensing device, a volume of the temperature sensing device, a distance between a center of the temperature sensing device and the surface of the measured object, and a contact area between the temperature sensing device and the measured object;

determining a second factor based on one or more of the first factor and a conductivity coefficient of the temperature sensing device; and determining the temperature compensation factor at the current moment based on one or more of the second factor, the temperature measured by the temperature sensing device at the current moment, the temperature measured by the temperature sensing device at the moment previous to the current moment, and a time interval between the current moment and the moment previous to the current moment.

3. The method for measuring a surface temperature of a measured object as claimed in claim 1, further comprising:

obtaining a correction factor of a medium when the medium is present between the measured object and the temperature sensing device, the medium being in thermally conductive contact with the surface of the measured object and a surface of the temperature sensing device, respectively, throughout the temperature measurements;

wherein the step of determining a surface temperature of the measured object at the current moment based on one or more of the temperature measured by the temperature sensing device at the current moment, the temperature compensation factor at the current moment, the correction factor of the temperature compensation factor, and the static correction factor comprises:

determining the surface temperature of the measured object at the current moment based on one or more of the temperature measured by the temperature sensing device at the current moment, the temperature compensation factor at the current moment, the correction factor of the temperature compensation factor, the static correction factor, and the correction factor of the medium.

4. The method for measuring a surface temperature of a measured object as claimed in claim 1, wherein an ADC of the temperature sensing device has an acquisition accuracy of at least 8 bits.

5. An apparatus for measuring a surface temperature of a measured object, comprising:

a temperature measurement acquisition module configured to obtain a temperature measured by a temperature sensing device at a current moment and at a moment previous to the current moment after the temperature sensing device contacts with a surface of the measured object for a set duration, wherein the temperature sensing device is in thermally conductive contact with the surface of the measured object throughout the temperature measurements;

a temperature compensation factor determination module configured to determine a temperature compensation factor at the current moment based on the temperature measured by the temperature sensing device at the current moment and at the moment previous to the current moment;

a first correction factor acquisition module configured to obtain a correction factor of the temperature compensation factor;

a second correction factor acquisition module configured to obtain a static correction factor, wherein the static correction factor is pre-determined by simulations to correct the temperature measured by the temperature sensing device at the current moment; and an object surface temperature acquisition module configured to determine a surface temperature of the measured object at the current moment based on one or more of the temperature measured by the temperature sensing device at the current moment, the temperature compensation factor at the current moment, the correction factor of the temperature compensation factor, and the static correction factor.

6. The apparatus for measuring a surface temperature of a measured object as claimed in claim 5, wherein the temperature compensation factor determination module is specifically configured to:

determine a first factor based on one or more of a specific heat capacity of the temperature sensing device, a density of the temperature sensing device, a volume of the temperature sensing device, a distance between a center of the temperature sensing device and the surface of the measured object, and a contact area between the temperature sensing device and the measured object;

determine a second factor based on one or more of the first factor and a conductivity coefficient of the temperature sensing device; and determine the temperature compensation factor at the current moment based on one or more of the second factor, the temperature measured by the temperature sensing device at the current moment, the temperature measured by the temperature sensing device at the moment previous to the current moment, and a time interval between the current moment and the moment previous to the current moment.

7. The apparatus for measuring a surface temperature of a measured object as claimed in claim 5, further comprises:

a third correction factor acquisition module configured to obtain a correction factor of a medium when the medium is present between the measured object and the temperature sensing device, wherein the medium is in thermally conductive contact with the surface of the measured object and a surface of the temperature sensing device, respectively, throughout the temperature measurements;

wherein the object surface temperature acquisition module is further configured to determine the surface temperature of the measured object at the current moment based on one or more of the temperature measured by the temperature sensing device at the current moment, the temperature compensation factor at the current moment, the correction factor of the temperature compensation factor, the static correction factor, and the correction factor of the medium.

8. The apparatus for measuring a surface temperature of a measured object as claimed in claim 5, wherein an ADC of the temperature sensing device has an acquisition accuracy of at least 8 bits.

9. A method for measuring a surface temperature of a measured object, comprising:

obtaining a temperature measured by a temperature sensing device at a current moment and at a moment previous to the current moment after the temperature sensing device contacts with a surface of the measured object for a set duration, the temperature sensing device being in thermally conductive contact with the surface of the measured object throughout the temperature measurements;

determining a temperature compensation factor at the current moment based on the temperature measured by the temperature sensing device at the current moment and at the moment previous to the current moment;

obtaining a correction factor of the temperature compensation factor; and determining a surface temperature of the measured object at the current moment based on one or more of the temperature measured by the temperature sensing device at the current moment, the temperature compensation factor at the current moment, and the correction factor of the temperature compensation factor.

10. The method for measuring a surface temperature of a measured object as claimed in claim 9, wherein the step of determining a temperature compensation factor at the current moment based on the temperature measured by the temperature sensing device at the current moment and at the moment previous to the current moment, comprises:

determining a first factor based on one or more of a specific heat capacity of the temperature sensing device, a density of the temperature sensing device, a volume of the temperature sensing device, a distance between a center of the temperature sensing device and the surface of the measured object, and a contact area between the temperature sensing device and the measured object;

determining a second factor based on one or more of the first factor and a conductivity coefficient of the temperature sensing device; and determining the temperature compensation factor at the current moment based on one or more of the second factor, the temperature measured by the temperature sensing device at the current moment, the temperature measured by the temperature sensing device at the moment previous to the current moment, and a time interval between the current moment and the moment previous to the current moment.

11. The method for measuring a surface temperature of a measured object as claimed in claim 9, further comprising:

obtaining a correction factor of a medium when the medium is present between the measured object and the temperature sensing device, the medium being in thermally conductive contact with the surface of the measured object and a surface of the temperature sensing device, respectively, throughout the temperature measurements;

wherein the step of determining a surface temperature of the measured object at the current moment based on one or more of the temperature measured by the temperature sensing device at the current moment, the temperature compensation factor at the current moment, and the correction factor of the temperature compensation factor comprises:

determining the surface temperature of the measured object at the current moment based on one or more of the temperature measured by the temperature sensing device at the current moment, the temperature compensation factor at the current moment, the correction factor of the temperature compensation factor, and the correction factor of the medium.

12. The method for measuring a surface temperature of a measured object as claimed in claim 9, wherein an ADC of the temperature sensing device has an acquisition accuracy of at least 8 bits.

* * * * *